(12) United States Patent
Chen et al.

(10) Patent No.: US 10,574,362 B2
(45) Date of Patent: Feb. 25, 2020

(54) METHOD AND APPARATUS FOR TRANSMITTER IQ SKEW AND INSERTION LOSS DETECTION FOR COHERENT OPTICAL SYSTEMS

(71) Applicant: Infinera Corporation, Sunnyvale, CA (US)

(72) Inventors: Chen Chen, San Jose, CA (US); Rene Marcel Schmogrow, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 16/166,943

(22) Filed: Oct. 22, 2018

(65) Prior Publication Data

US 2019/0326998 A1 Oct. 24, 2019

Related U.S. Application Data

(60) Provisional application No. 62/661,207, filed on Apr. 23, 2018.

(51) Int. Cl.
*H04B 10/556* (2013.01)
*H04B 10/61* (2013.01)
(Continued)

(52) U.S. Cl.
CPC ..... *H04B 10/5561* (2013.01); *H04B 10/2504* (2013.01); *H04B 10/6164* (2013.01); *H04L 27/2096* (2013.01); *H04B 10/613* (2013.01)

(58) Field of Classification Search
CPC ............ H04B 10/5561; H04B 10/2504; H04B 10/6164; H04B 10/613; H04B 10/5057; H04B 10/5059; H04B 10/5055; H04B 10/505; H04B 10/04; H04B 10/00; H04B 10/079; H04B 10/077; H04L 27/2096; H04L 1/00; G02F 1/21; G02F 1/0123; G02F 1/2255; G02F 1/01; G02B 6/42
(Continued)

(56) References Cited

U.S. PATENT DOCUMENTS 7,907,324 B2 *  3/2011  Hoshida ................ G02F 1/0123
                                                      359/239
8,463,138 B2 *  6/2013  Sugihara ............... G02F 1/0123
                                                      398/182
(Continued)

*Primary Examiner* — Abbas H Alagheband
(74) *Attorney, Agent, or Firm* — David L. Soltz

(57) ABSTRACT

A system and method are disclosed to characterize and correct for the effects of IQ skew and insertion loss in a coherent optical transmitter. The coherent optical transmitter receives a digital data signal including in-phase (I) and quadrature (Q) components and generates corresponding first and second dither signals. The first dither signal may be combined with the I component and the second dither signal may be combined with the Q component to generate I and Q combined signals, which may be converted into I and Q analog waveforms. An optical signal may be generated corresponding to the I and Q analog waveforms for transmission over an optical fiber. The IQ skew and/or insertion loss for the coherent optical transmitter may then be calculated based on the optical signal using the disclosed dither tone processing techniques in order to correct IQ skew and/or insertion loss impairment.

18 Claims, 8 Drawing Sheets

(51) Int. Cl.
*H04L 27/20* (2006.01)
*H04B 10/25* (2013.01)

(58) Field of Classification Search
USPC .......................................................... 398/208
See application file for complete search history.

(56) References Cited

U.S. PATENT DOCUMENTS

| | | | | |
|---|---|---|---|---|
| 8,693,897 | B2* | 4/2014 | Mo | H04B 10/697 |
| | | | | 398/136 |
| 9,112,609 | B2* | 8/2015 | Kim | H04J 14/06 |
| 9,184,834 | B1* | 11/2015 | Zhang | H04B 10/50 |
| 9,705,592 | B1* | 7/2017 | Schmogrow | G02F 1/2255 |
| 9,806,806 | B1* | 10/2017 | Rohde | H04B 10/07955 |
| 9,838,138 | B1* | 12/2017 | Arabaci | H04B 10/612 |
| 9,853,734 | B1* | 12/2017 | Fan | H04B 10/40 |
| 9,979,472 | B1* | 5/2018 | Wang | H04B 10/541 |
| 10,038,498 | B1* | 7/2018 | Fan | H04B 10/50 |
| 10,218,437 | B2* | 2/2019 | Rohde | H04B 10/07955 |
| 2005/0118963 | A1* | 6/2005 | Chiu | H03C 3/406 |
| | | | | 455/115.1 |
| 2008/0187324 | A1* | 8/2008 | Akiyama | H04B 10/50 |
| | | | | 398/188 |
| 2010/0129088 | A1* | 5/2010 | Akasaka | H04B 10/50577 |
| | | | | 398/188 |
| 2012/0148260 | A1* | 6/2012 | Akiyama | H04B 10/505 |
| | | | | 398/184 |
| 2012/0300818 | A1* | 11/2012 | Metreaud | H04B 1/30 |
| | | | | 375/219 |
| 2013/0223571 | A1* | 8/2013 | Dark | H04B 1/0028 |
| | | | | 375/340 |
| 2014/0233084 | A1* | 8/2014 | Ono | G02F 1/01 |
| | | | | 359/279 |
| 2015/0030333 | A1* | 1/2015 | Sun | H04L 1/0052 |
| | | | | 398/79 |
| 2015/0229438 | A1* | 8/2015 | Le Taillandier De Gabory | H04B 10/2581 |
| | | | | 398/182 |
| 2015/0280856 | A1* | 10/2015 | Nakashima | H04B 10/614 |
| | | | | 398/65 |
| 2018/0074348 | A1* | 3/2018 | Fujita | H04B 10/516 |
| 2018/0198531 | A1* | 7/2018 | Bhandare | H04B 10/588 |
| 2019/0072731 | A1* | 3/2019 | Yamazaki | H04B 10/25 |

* cited by examiner

METHOD AND APPARATUS FOR TRANSMITTER IQ SKEW AND INSERTION LOSS DETECTION FOR COHERENT OPTICAL SYSTEMS

CROSS REFERENCE TO RELATED APPLICATIONS

This application claims the benefit of U.S. Provisional Application No. 62/661,207, filed Apr. 23, 2018, which is incorporated by reference as if fully set forth herein.

FIELD OF INVENTION

The disclosure relates generally to optical communication systems, and in particular the characterization and the correction for the effects of IQ skew and insertion loss.

BACKGROUND

Optical communication systems use digital modulation techniques to convert digital information (e.g., bits) into symbols carried by optical signals (e.g., light pulses) through an optical fiber. Optical signals are capable of high-speed data transfer and also high quality data transfer because optical signals are not distorted by electromagnetic fields. An optical communication system includes an optical transmitter (TX) and an optical receiver (RX). At the optical transmitter, a digital data signal may be modulated into a phase-modulated and amplitude-modulated signal. The modulated signal includes orthogonal in-phase (I) and quadrature (Q) components, which are exploited by digital modulation techniques, such as quadrature amplitude modulation (QAM), to maximize the spacing between modulated symbols in order to maximize robustness of the symbols against distortions. The modulated signal may be converted at the transmitter into an optical signal and transmitted to the receiver via an optical fiber. The optical receiver may receive and demodulate the optical signal to recover the digital data.

SUMMARY

A system and method are disclosed to characterize and correct for the effects of IQ skew and insertion loss in a coherent optical transmitter. The coherent optical transmitter receives digital data signal including in-phase (I) and quadrature (Q) components and generates corresponding first and second dither signals. The first dither signal may be combined with the I component of the digital data signal and the second dither signal may be combined with the Q component of the digital data signal to generate I and Q combined signals, which may be converted into I and Q analog waveforms. An optical signal may be generated corresponding to the I and Q analog waveforms for transmission over an optical fiber. The IQ skew and/or insertion loss for the coherent optical transmitter may then be calculated based on the optical signal using the disclosed dither tone processing techniques in order to correct IQ skew and/or insertion loss impairment.

DETAILED DESCRIPTION OF THE EMBODIMENTS

Methods and apparatus are disclosed herein to characterize and determine the values of the IQ skew and insertion loss variation in transmitters in a hardware-efficient and cost-efficient manner. The determined values of the IQ skew and/or insertion loss may be used to compensate for impairments caused by IQ skew and/or insertion loss variation. The disclosed methods and apparatus may use, in a transmitter, a photodetector and ADC with a low bandwidth, for example on the order of a few kHz, to detect and measure IQ skew and insertion loss. According to the disclosed methods and apparatus, the transmitter produces low speed dither signals (e.g., on the order of a few kHz), which may be implemented using a delicate tone generation circuitry or the transmitter digital signal processor (DSP) application-specific integrated circuit (ASIC), for example. The I and Q paths are distinguished by applying a tone of the same frequency to one path at a time, or by applying tones with different frequencies to different paths, and the difference is calculated to determine the value of the IQ skew.

Figure 1:
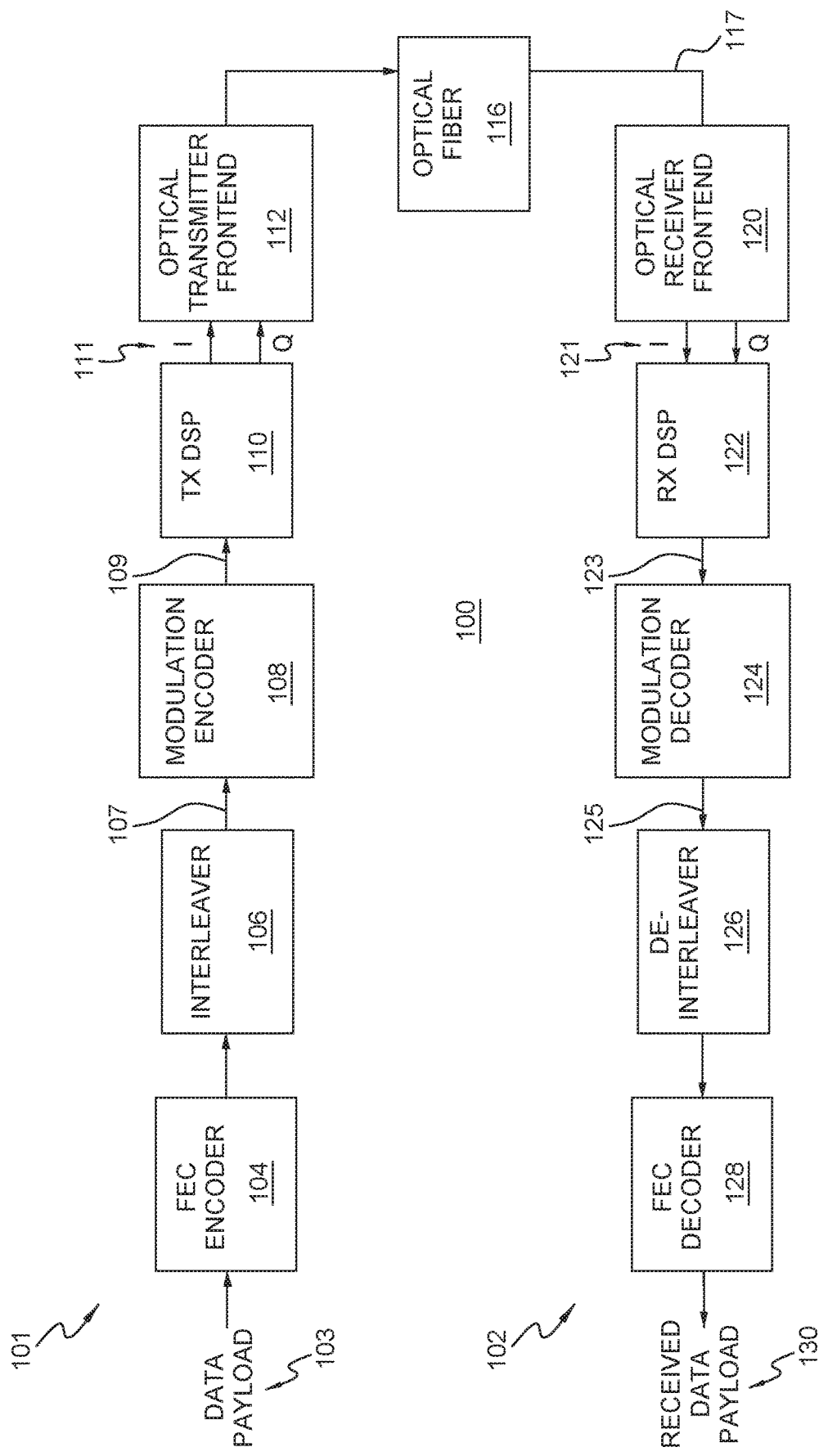
FIG. 1 is a system diagram of an example optical communication system.

FIG. 1 is a system diagram of an example optical communication system 100. The example coherent optical communication system 100 includes optical transmitter (TX) 101 and optical receiver (RX) 102. Any combination of the components may be used or omitted in the example coherent optical communication system 100 and other components, not shown, may be included.

At the transmitter 101, a forward error correction (FEC) encoder 104 may apply FEC to the payload data 103 to be transmitted to the receiver in order to improve data reliability by introducing data redundancy so that receiver 102 may detect and correct a limited number of errors without retransmission (using FEC decoder 128).

The encoded data may be interleaved by interleaver 106 to form a bit stream 107. For example, the interleaver 106 may shuffle and/or group bits provided by the FEC encoder 104 to reduce the risk of bit errors at the receiver 102.

Modulation encoder 108 may encode bits from the bit stream 107 into an output digital signal 109 having dual-polarization symbols each with in-phase (I) and quadrature (Q) components of the X and Y polarizations (i.e., symbols comprise components XI, XQ, YI and YQ). Common modulation techniques used in optical transmitters may include the family of M-ary phase-shift keying (M-PSK) and M-ary quadrature-amplitude modulation (M-QAM) modulation schemes (e.g., M equal to 2, 4, or 8, etc.). According to M-PSK or M-ary modulation, symbols are placed in a constellation (e.g., a two-dimensional constellation with in-phase and quadrature coordinates, or higher order constellations may be used for example including X and Y polarizations) such that the spacing between modulated symbols may be maximized in order to maximize robustness of the symbols against distortions.

The TX DSP 110 (e.g., any processor) may include one or more DSPs and may be configured to digitally modulate, apply spectral shaping and/or perform filtering on the digital signals 109 for the symbols received from modulation encoder 108. The TX DSP 110 may include digital-to-analog (D/A) converters and associated driver circuits (not shown) to convert the digital signals 109 into analog waveforms 111, corresponding to respective analog voltages, for each of the XI, XQ, YI, YQ components, which are provided to the optical transmitter frontend 112. The optical transmitter frontend 112 may include, for example, a laser source, an optical modulator, an optical combining device, and/or optical amplifier (not shown). In an example not shown, the optical transmitter frontend 112 may be implemented to include the TX DSP 110 and/or the optical coupler 114 (e.g., on a common ASIC).

In the optical transmitter frontend 112, an optical light from a laser may be modulated by a dual-polarization I-Q modulator using the analog waveforms 111 to convey the data symbols in a dual-polarization optical signal transmitted over optical fiber 116. For example, a dual-polarization I-Q modulator may split the optical light from the laser and modulate the split portions of light using the XI, XQ, YI, YQ drive signals (i.e., the I and Q components for each of the X and Y polarizations). In the dual-polarization I-Q modulator, one or more couplers may combine the XI and XQ components and the YI and YQ components, respectively, to produce an X polarization (Xpol) optical signal and a Y polarization (Ypol) optical signal. A polarization rotator in the dual-polarization I-Q modulator may be used to rotate the polarization of optical signals to obtain the Y polarization components YI and YQ. The dual-polarization I-Q modulator may further include a polarization beam combiner (PBC), which may combine the Xpol and Ypol optical signals for transmission on optical fiber 116 to optical receiver 102.

The optical receiver 102 may include an optical receiver frontend 120 that receives the optical signals 117 on optical fiber 116. The optical receiver frontend 120 may include, for example, a laser source, a dual-polarization coherent receiver, and/or an optical de-combining device (not shown). A dual-polarization coherent receiver in the optical receiver frontend 120 may receive a reference signal from a laser and convert the received optical signals to baseband analog signals 121 (carrying received symbols each with XI', XQ', YI', YQ' components). The optical receiver 102 may include RX DSP 122, which may include analog-to-digital (A/D) converters (not shown) that may convert the analog signals 121 to digital signals and further process the digital signals (e.g., reduce phase noise, chromatic dispersion, timing skews due to transmission) to output digital signals 123 including digitized sequences of symbols [X', Y'] (i.e., each symbol has respective XI, XQ, YI and YQ components). The modulation decoder 124 may decode the digital signals 123 to generate bits 125. In an example, maximum-correlation decoding may be used by modulation decoders 126, such that other decoding techniques may be used. The detected bits 125 may be de-interleaved by deinterleaver 126 (e.g., corresponding to the rearranging or bit grouping performed by the interleaver 106 at the transmitter 101) before being provided to the FEC decoder 128 to perform error correction/detection and generate the received payload data 130.

Methods and apparatus are described herein to characterize (detect and measure) the following critical performance impairments that are commonly encountered in optical transmitters (e.g., optical transmitter 101 of FIG. 1): IQ skew and radio frequency (RF) amplitude response leading to insertion loss, both of which are not constant and may vary at different radio frequencies. The physical path in an optical transmitter traversed by a signal includes an electrical path and an optical path. IQ skew may naturally arise from the physical path length difference between the in-phase (I) path and the quadrature (Q) path in an optical transmitter, such that the in-phase data signal may experience a different time delay from the quadrature data signal. With reference to FIG. 1, the interconnect 111 between TX DSP 110 and Optical transmitter frontend 112 are electrical paths, which may be composed of high-speed electrical traces on a printed circuit board (PCB) and/or high-speed electrical cables, and an optical path may exist in the optical transmitter frontend 112 (e.g., due to conversion of high-speed electrical signals on I and Q paths 111 to high-speed optical signals by an optical modulator in optical transmitter frontend 112).

For example, a path length difference between the I and Q paths may arise due to any one or more of the following causes: a length difference of electrical trace or cable between TX DSP 110 and Optical Transmitter Frontend 112; a path length difference of interconnect or trace inside optical transmitter frontend 112, where the path may be electrical, optical or both; and/or delay difference between I and Q path within TX DSP 110.

In an example, a path length difference between the I path and Q path may cause delays in signal combining of the I and Q components of the Xpol and Ypol optical signals in the optical transmitter frontend 112. The time delay (or timing offset) between the I path and Q path may lead to degradation of signal integrity and communication system performance, and may cause packet loss, packet error, and/or traffic interruption in some cases. The physical path of the data signal, and in particular the I and Q components of the data signal, is comprised of an RF electrical path and an optical path, and it may be extremely challenging to match the I and Q path lengths within a couple of picoseconds (ps). In modern communication systems where high symbol rates and large modulation constellations (or high-order modulation formats) are used, timing offset of even a few picoseconds may be sufficient to cause significant degradation of signal integrity. In addition, the IQ path skew may vary with RF frequency due to complex phase responses of transmitter hardware in the in-phase and quadrature paths. Therefore, there is a need for solutions to precisely characterize the frequency dependent skew effects. The determination of the precise skew effects may be used to effectively compensate for the skew impairment (this process is known as de-skewing) such that a more robust transmitter signal and improved optimal communication system performance may be established.

In addition to skew impairment between I and Q paths in the transmitter, another known impairment is the frequency dependent insertion loss of a transmitter. It may impair signal integrity and quality and overall communication system performance. In the other words, insertion loss of a transmitter tends to vary with RF frequency insertion loss, which may be caused by any number of factors including, but not limited to, inductance-resistance-capacitance (LRF) effect, skin effect, RF signal reflection, and/or concatenating RF characteristics from the constituent hardware components in I and Q paths. Therefore, there is also a need for solutions to precisely characterize the frequency dependent insertion loss, which may then be used to effectively compensate for the insertion loss and improve the performance of the transmitter and overall communication system.

An existing method to characterize IQ skew and insertion loss is to use a high bandwidth photodetector and sampling device (such as an ADC). The bandwidth of the photodetector and sampling device needs to be sufficiently high (e.g., on the order of several tens of GHz) so that it can capture all or most of the frequency content of high speed transmitter signals. The transmitter may need to be configured with a special or known signal pattern in order to be able to compute the skew and insertion loss when combined with the oscilloscope measurement using signal processing. This solution requires a delicate apparatus, which may be expensive due to the high bandwidth required.

Methods and apparatus are disclosed herein to characterize IQ skew and frequency dependent insertion loss that are hardware-efficient and drastically lower cost than existing solutions because the disclosed solutions use a low-speed photodetector and sampling device rather than costly high-speed devices. The disclosed methods and apparatus may use a photodetector and ADC with a low bandwidth, for example on the order of a few kHz, to characterize IQ skew and RF insertion loss. According to the disclosed methods and apparatus, the transmitter produces low speed dither signals (e.g., on the order of a few kHz), which may be implemented using delicate tone generation circuitry or using the transmitter DSP ASIC, for example. Then, the I and Q paths are distinguished by applying a tone of the same frequency to one path at a time, or by applying tones with different frequencies to different paths.

Because of the reduced cost, the disclosed methods and apparatus may be more easily adopted during production or integrated as part of an optical transmitter with minimal cost increase. The disclosed methods and apparatus also make it easier and more affordable to implement and perform IQ skew and insertion loss characterization during transmitter start up in the field and/or during transmitter operation.

The proposed solutions are described herein in the context of optical communication systems, however it is understood by someone skilled in the art that the disclosed solutions may be similarly applied to characterize skew and/or insertion loss in any type of communication system including any type of wired or wireless communication system.

Figure 2:
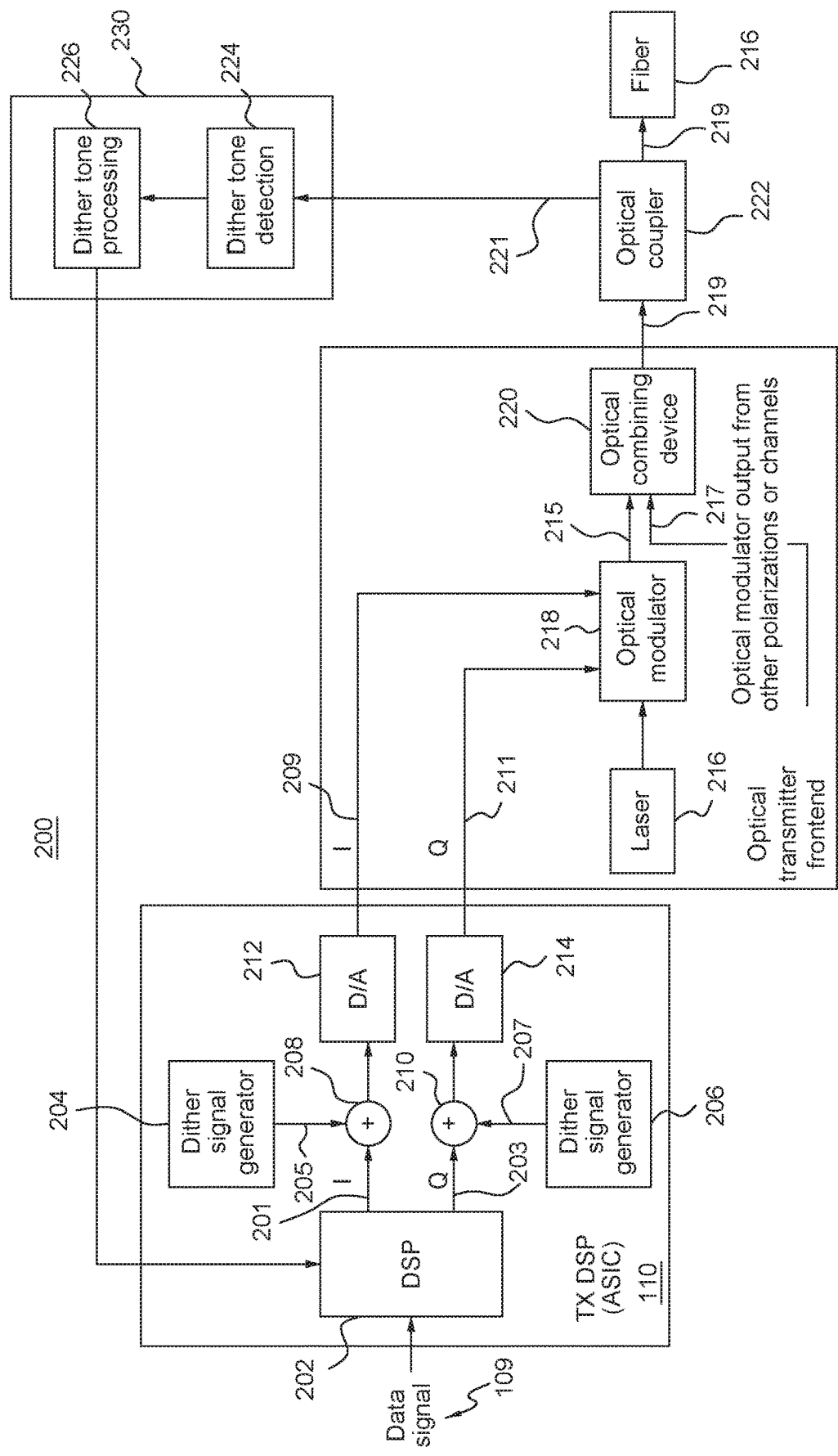
FIG. 2 is a block diagram of an example embodiment of an IQ skew and insertion loss characterization system implemented in an optical transmitter, in accordance with the disclosures herein.

FIG. 2 is a block diagram of an example embodiment of an IQ skew and insertion loss characterization system implemented in an optical transmitter 200 (e.g., optical transmitter 101 in FIG. 1), in accordance with the disclosures herein. The example IQ skew and insertion loss characterization system in transmitter 200 generates dither signals inside in the TX DSP (ASIC) 110, as described in the following. Not all elements of the transmitter 200 are shown in FIG. 2, and other components, such as any one or more of the components shown or described in FIG. 1, may also be included. Moreover, any number of the components in the transmitter 200 of FIG. 2 may be omitted or combined into one or more common components (e.g., a common ASIC). The example transmitter 200 includes at least TX DSP 110, optical transmitter frontend 112, an optical coupler 222, a dither tone detection circuit 224, and a dither tone processing circuit 226. The TX DSP 110 may include, but is not limited to include, a DSP 202, dither signal generators 204 and 206, combiners 208 and 210, D/A converters 212 and 214. The optical transmitter frontend 112 may include, but is not limited to include, a laser 216, an optical modulator 218, and an optical combining device 220.

The TX DSP 110 receives the digital data signal 109 (e.g., from modulation encoder 108 in FIG. 1) carrying the digitized user data as a bit stream (of "0"s and "1"s) to be optically modulated (e.g., by optical modulator 218) and transmitted in the optical fiber 116. The TX DSP 110 transforms the data signal bit stream 109 into a digital representation and may include digital components such as DSP 202 and/or other components not shown, which may perform variety of functions including, but not limited to, framing, error correction encoding, pulse shaping, pre-compensation, and/or de-skewing.

The dither signal generators 204/206 generate dither signals 205/207, which may be a plurality of waveforms that exhibit harmonics. Examples of dither signal waveforms include, but are not limited to, sinusoid, square, triangle, and/or trapezoid. Standard digital circuits for generating dither signals, as known to one skilled in the art (e.g., using shift registers, filters, digital logic gates and/or clocks), may be used for the dither signal generators 204 and 206. Embodiments for determining the content of the dither signals 205 and 207, which is important to the effectiveness of the IQ skew and insertion loss characterization system, are described in greater detail below. The generated dither signals 205 and 207 are combined, using combiners 208 and 210, with the in-phase and quadrature components 201 and 203, respectively, of data signal 109 as produced by DSP 202. The combined I and Q signals 209 and 211 are converted into analog I and Q signals 209 and 211 using a plurality of D/A converters 212 and 214.

The optical transmitter front end 112 may be comprised of a laser source 216, an optical modulator 218, and/or an optical combining device 220, such as an optical coupler or array waveguide grating (AWG). The analog signals 209 and 211 output by the D/A converters 212 and 214, and which contain the dither signals 205 and 207, are applied to the in-phase and quadrature arms of the optical modulator 218 (e.g., a complex IQ Mach-Zehnder modulator) to optically modulate the signal from laser 216 and produce optical signal 215. In an example, the optical signal 215 may be for a single polarization such as the Xpol, and similar components and circuits may be used to generate an optical signal 217 for the other polarization, such as the Ypol. The optical combining device 220 may combine optical signals 217 from other polarizations (e.g., if the system 200 is for the Xpol, then the optical signals 217 may be the I and Q components for the Ypol) or other wavelength channels with the optical signal 215 before launching to optical fiber 116. An optical amplifier, not shown, may be included as part of the optical transmitter front end 112 to amplify the optical signal.

As part of dither tone detection, which is part of the IQ skew and insertion loss characterization system, optical signals 221 are produced by optical coupler 221 by branching off a portion of the optical signals 219, and provided to dither tone processor 230, which may include a dither tone detection circuit 224 and dither tone processing circuit 226 (circuits 224 and 226 may be separate or combined). Dither tone processing performed by dither tone processor 230 calculates the IQ skews and insertion loss and characterizes the IQ skews and insertion loss over different frequencies. The IQ skew and insertion loss values calculated by dither tone processor 230 are provided back to the DSP 202 in the TX DSP ASIC 110, and the DSP applies IQ skew and insertion loss correction using the calculated IQ skew and insertion loss values to the data signal 109 to provide in-phase and quadrature components 201 and 203 with reduced or removed IQ skew and insertion loss variation. The correction processes are known as de-skewing for skew correction, and pre-compensation/pre-emphasis/pre-equalization for insertion loss correction. An example implementation of dither tone processor 230 is shown and described in FIG. 4.

In an example, signals may be tagged to indicate different polarization and/or wavelength channels, for example by using dither tone signals of different frequencies. In this case, a single dither tone processor 230 may serve all polarizations and wavelength channels, which increases hardware efficiency and decrease implementation cost, although multiple dither tone processors 230 may be used.

Figure 3:
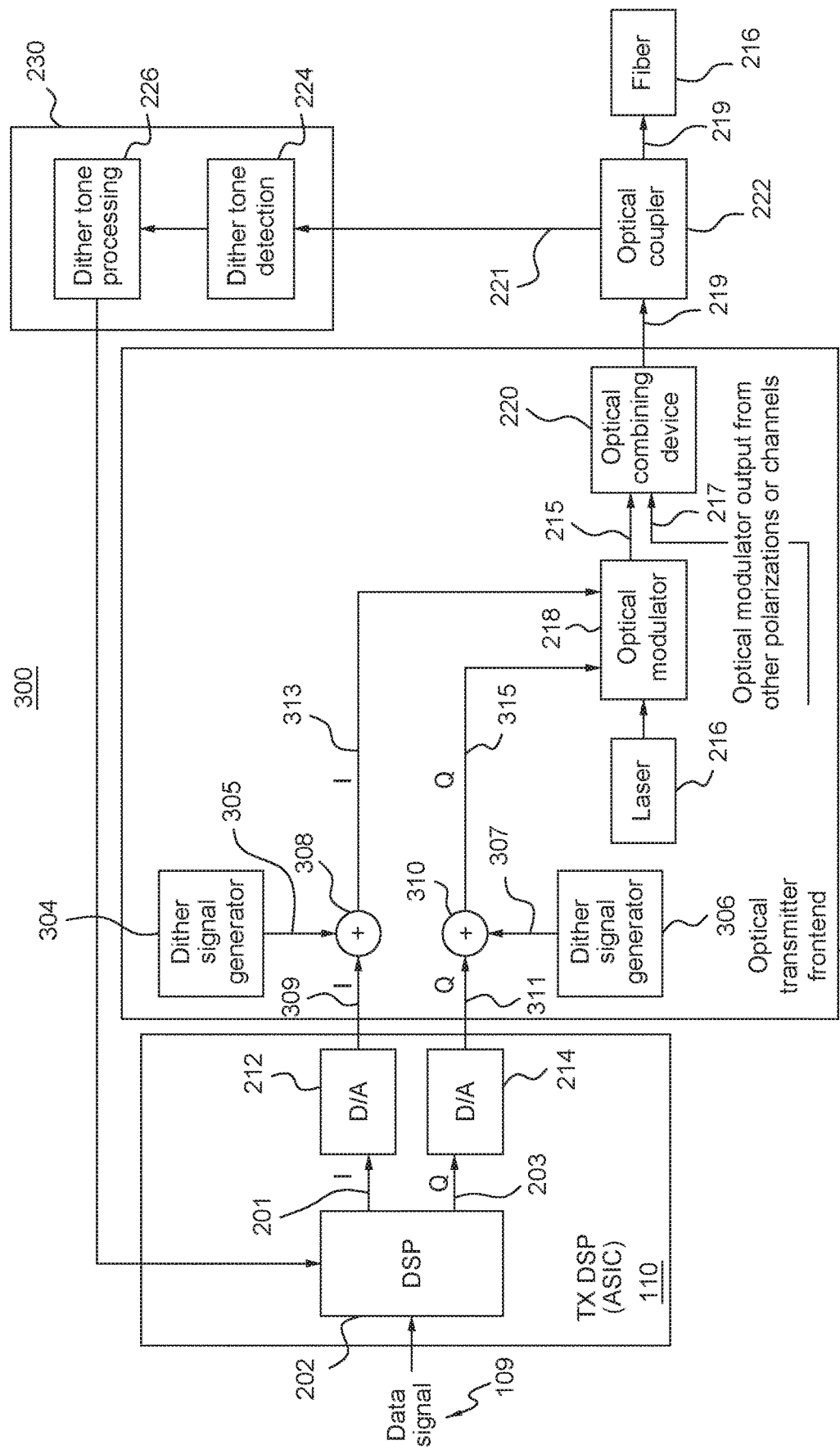
FIG. 3 is a block diagram of another example embodiment of an IQ skew and insertion loss characterization system implemented in an optical transmitter, in accordance with the disclosures herein.

FIG. 3 is a block diagram of another example embodiment of an IQ skew and insertion loss characterization system implemented in an optical transmitter 300 (e.g., optical transmitter 101 in FIG. 1), in accordance with the disclosures herein. The example IQ skew and insertion loss characterization system and transmitter 300 operate similarly to insertion loss characterization system and transmitter 200 in FIG. 2, with the difference that the dither signals 305 and 307 are generated by dither signal generators 304 and 306, respectively, and combined with analog signals 309 and 311, respectively, outside the TX DSP (ASIC) 110. For example, the dither signals may be generated using one or more standalone analog circuits or FPGA (i.e., dither signal generators 304 and 306), which may (or may not) be part of the optical transmitter frontend 112. Thus, for the example transmitter 300 of FIG. 3, the analog I and Q signals 309 and 311 do not include dither signals. Rather, the analog I and Q signals 309, output by D/A converters 212 and 214, are combined, using combiners 308 and 310, with dither signals 305 and 307 in the optical transmitter frontend 112 (or elsewhere) to generate combined analog I and Q signals 313 and 315 that are provided to optical modulator 218 and the rest of the transmitter 300.

Figure 4:
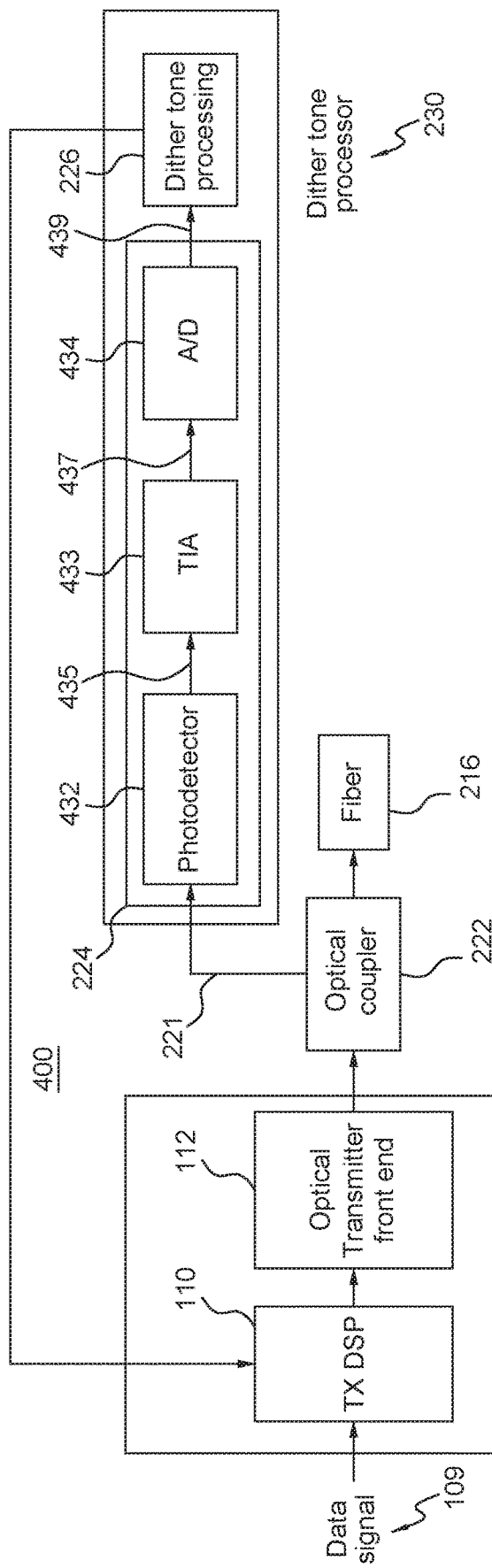
FIG. 4 is a block diagram of an example dither tone processor implemented in an optical transmitter, in accordance with the disclosures herein.

FIG. 4 is a block diagram of an example dither tone processor 230 (e.g., dither tone processor 230 in FIG. 2 or FIG. 3) implemented in an optical transmitter 400, in accordance with the disclosures herein. Only a subset of the components of optical transmitter 400 are shown for context, such that optical transmitter 400 may further include any of the components and may operate as described herein (e.g., refer to transmitters 101, 200 and 300 described in FIGS. 1, 2 and 3). Dither tone processor 230 may include dither tone detection circuit 224 and dither tone processing circuit 226.

The dither tone detection circuit 224 may include photodetector 432, transimpedance amplifier (TIA) 433 and/or A/D converter 434. The photodetector 232 may convert optical signals 221 from optical coupler 222 into an optical signal in the form of electrical current 435. For example, photodetector 232 may include, but is not limited to include, a photodiode, an electrical amplifier circuit, and/or an analog filter (not shown) to suppress noise outside dither frequencies of interest. TIA 433 may convert the electrical current 435 into an electrical voltage 437 with a certain amplification or gain. A/D converter 434 may convert the analog electrical voltage 437 into digital samples 439 to enable digital signal processing (e.g., in TX DSP 110). Example DSP algorithms for dither tone processing, that may be implemented in dither tone processing circuit 226 to calculate the IQ skew and insertion loss values in transmitter 400, are described in detail below. In an example, dither tone processor 230 may be implemented as a standalone apparatus outside of an optical transmitter 400, or may be an incorporated as part of an optical transmitter 400.

Example algorithms to calculate the IQ skew and insertion loss values in a transmitter (e.g., in a dither tone processor 230) and enable characterization of transmitter impairment are described in the following.

In an embodiment, algorithms may be used to calculate and characterize the skew between the I and Q paths in a transmitter using two iterations of dither signal generation and measurement, where the resultant difference signal e(t) is formed by taking the difference between the two consecutive digital sample measurements (i.e., a serial implementation), as described in the following. The skew characterization and detection method may employ a combination of the dither signals, denoted as $s_I$ and $s_Q$, that are applied to the I and Q transmitter paths/signals, respectively (e.g., as described above). In an example embodiment, the dither signals $s_I$ and $s_Q$ may contain frequency content as defined by the following equations as a function of time t:

$$s_I(t)=\sin[\omega_c t+\varphi_I)(1+\sin(\omega t))] \quad \text{Equation (1a)}$$

$$s_Q(t)=\cos[(\omega_c t+\varphi_Q)(1+\sin(\omega t))] \quad \text{Equation (1b)}$$

where $\omega_c$ and $\omega$ are primary and secondary frequencies for the sinusoid waveforms, and $\varphi_I$ and $\varphi_Q$ are phases the frequency $\omega_c$ in I and Q paths, respectively. For simplicity of mathematical expression, it may be assumed that $s_I$ and $s_Q$ have the same amplitude, however $s_I$ and $s_Q$ dither signals may have different amplitudes, such that the skew characterization and detection method is not sensitive to amplitude difference and operates similarly for different amplitudes.

In an example, it may be assumed that a complex IQ Mach-Zehnder modulator is used as an optical modulator in the optical transmitter frontend to convert analog signals into optical signals, such as the Mach-Zehnder modulator described in U.S. Pat. No. 9,705,592, which is incorporated herein by reference in its entirety. The dither signals $s_I$ and $s_Q$ may be transformed into the optical field (i.e., into optical signals) without distortion in an ideal complex IQ Mach-Zehnder modulator under proper bias conditions. A complex IQ Mach-Zehnder modulator contains an in-phase (I) modulator and a quadrature (Q) modulator, both of which are known in the art.

With reference to FIG. 4, the optical power $P_{opt}(t)$ of the optical signal 221 entering the photodetector 432 may be defined by the following equation:

$$P_{opt}(t) = E(t)E^*(t) = [s_I(t-\tau_I) + e^{j\phi_S}s_Q(t-\tau_Q)]^2 = \quad \text{Equation (2)}$$
$$\sin^2[\omega_c(t-\tau_I) + \varphi_I][1+\sin(\omega(t-\tau_I))]^2 +$$
$$\cos^2[\omega_c(t-\tau_Q) + \varphi_Q][1+\sin(\omega(t-\tau_Q))]^2 +$$
$$\cos(\phi_S)\sin[\omega_c(t-\tau_I) + \varphi_I]\cos[\omega_c(t-\tau_Q) + \varphi_Q]$$
$$[1+\sin(\omega(t-\tau_I))] \times [1+\sin(\omega(t-\tau_Q))]$$

where $\phi_S$ represents the optical phase difference between in-phase and quadrature paths (which can be controlled by for example the dc bias point of the optical modulator), and $\tau_I$ and $\tau_Q$ represent the time delays in the in-phase and quadrature path, respectively. The difference between $\tau_I$ and $\tau_Q$ is the IQ skew (or effectively the time offset between the I and Q paths) of the transmitter.

By only including the first-order term with respect to frequency ω (i.e., the term proportional to the first harmonic of the frequency co), and by assuming $\omega\tau_I \cong 0$ and $\omega\tau_Q \cong 0$ (which may be assumed in the case that frequency ω is much smaller compared to the inverse of time delay), the optical power $P_{opt}(t)$ may be approximated by the following equation:

$$P_{opt}(t) \approx \sin[\omega(t-\tau_I)] + \sin[\omega(t-\tau_Q)] + \cos(\phi_S)\sin[-\omega_c(\tau_I-\tau_Q) + (\varphi_I-\varphi_Q)]\sin(\omega t) \qquad \text{Equation (3)}$$

With reference to FIG. 4, the photodetector 432 may detect the optical power $P_{opt}(t)$ of the optical signal 221 and convert it into electrical signal 435 after analog filtering. In this case, the digital samples d(t) (digital samples 437 after A/D conversion 434 in FIG. 4) present in the dither tone processor 230 may be expressed by the following equation:

$$d(t) \approx \sin[\omega(t-\tau_I)] + \sin[\omega(t-\tau_Q)] + \cos(\phi_S)\sin[-\omega_c(\tau_I-\tau_Q) + (\varphi_I-\varphi_Q)]\sin(\omega t) \qquad \text{Equation (4)}$$

First-order terms may be included with respect to frequency ω only, because frequency ω is the frequency of interest (the frequency to be detected) for the dither tone processor 230. The amplitude of frequency ω may be calculated, for example using spectrum analysis, lock-in detection or any other amplitude detection technique.

In determining the IQ skew, the dither signals may be altered so that the dither signal $s_Q$ for the Q path has a 180-degree phase change. In this case, dither signals may be calculated using the following equations, which illustrate the negative sign for the dither signal $s_Q$ for the Q path in Equation (5b) compared to Equation (1b):

$$s_I(t) = \sin[(\omega_c t + \varphi_I)(1 + \sin(\omega t))] \qquad \text{Equation (5a)}$$

$$s_Q(t) = -\cos[(w_c t + \varphi_Q)(1 + \sin(\omega t))] \qquad \text{Equation (5b)}$$

Then, the estimate of the optical power $P_{opt}(t)$ is calculated as follows:

$$P_{opt}(t) \approx \sin[w(t-\tau_I)] + \sin[\omega(t-\tau_Q)] - \cos(\phi_S)\sin[-\omega_c(\tau_I-\tau_Q) + (\varphi_I-\varphi_Q)]\sin(\omega t) \qquad \text{Equation (6)}$$

Again, the digital samples d(t) present in the dither tone processor 230 (digital samples 437 after A/D conversion 434 in FIG. 4) may contain the same frequency content in optical power. In this case, the digital samples d(t) (digital samples 437 after A/D conversion 434 in FIG. 4) present in the dither tone processor 230 may be expressed by the following equation:

$$d_{phase\ change}(t) \approx \sin[\omega(t-\tau_I)] + \sin[\omega(t-\tau_Q)] - \cos(\phi_S)\sin[-\omega_c(\tau_I-\tau_Q) + (\varphi_I-\varphi_Q)]\sin(\omega t) \qquad \text{Equation (7)}$$

Then, the difference between the two measurements (one for the original dither signals d(t) and the other for the dither signals with the phase change $d_{phase\ change}(t)$) may be calculated so the common terms $\sin[\omega_{AM}(t-\tau_I)] + \sin[\omega_{AM}(t-\tau_Q)]$ cancel each other out to result in the following equation:

$$d\_diff(t) = 2\cos(\phi_S)\sin[-\omega_c(\tau_I-\tau_Q) + (\varphi_I-\varphi_Q)]\sin(\omega t) \qquad \text{Equation (8a)}$$

The amplitude of frequency ω of Equation (8a) may then be expressed by the following equation:

$$e(t) = d(t) - d_{phase\ change}(t) = \qquad \text{Equation (8b)}$$
$$2\cos(\phi_S)\sin[-\omega_c(\tau_I - \tau_Q) + (\varphi_I - \varphi_Q)]$$

where the resultant difference signal e(t) is a function of IQ skew.

It can be seen from Equation (8b) that the resultant difference signal e(t) can become zero under certain conditions. An example condition where difference signal e(t) can become zero is when the phase between the in-phase and quadrature paths is an odd integer multiple of 90 degrees, causing the cosine term in the Equation (8b) to zero. In the context of coherent optical transmitters, where the phase between in-phase and quadrature paths must be an odd integer multiple of 90 degree during normal operation, the optical transmitter may detune (i.e., deviate from the normal operation) for the purpose of measuring the IQ skew and at the expense of potential sub-optimal transmitter performance. For example, during a transmitter startup phase, turn down phase, and during certain wavelength tuning processes, there may be no restriction on the phase difference between the I and Q paths, providing an appropriate scenario to detune the phase and perform the IQ skew measurement.

Another example condition where difference signal e(t) can become zero is when the digital phase introduced via $\varphi_I$ and $\varphi_Q$ can exactly cancel the phase difference arising from the IQ skew or equivalently the time delay difference between the in-phase and quadrature paths, which is represented as $\omega_c(\tau_I - \tau_Q)$. In this case, the IQ skew, which is the difference in time delays $\tau_I$ and $\tau_Q$ in the in-phase and quadrature paths, may be calculated using the following equation:

$$\tau_I - \tau_Q = \frac{\varphi_I - \varphi_Q}{\omega_c} \qquad \text{Equation (9)}$$

In this case, the dither tone process described above may be repeated by sweeping (i.e., scanning or varying) the difference between phase shift values ($\varphi_I - \varphi_Q$) until the resultant difference signal e(t) becomes zero, then Equation (9) may be used to compute the IQ skew. Alternatively, the dither tone process described above may be repeated with two or more phase ($\varphi_I - \varphi_Q$) settings, so a fit can be performed to determine where the resultant difference signal e(t) would become zero, then Equation (9) may be used to compute the IQ skew.

The methods and equations above for calculating IQ skew by calculating the difference signal e(t) may be used to measure any frequency-dependent skew by using the appropriate frequency $\omega_c$ in dither signal generation.

Figure 5:
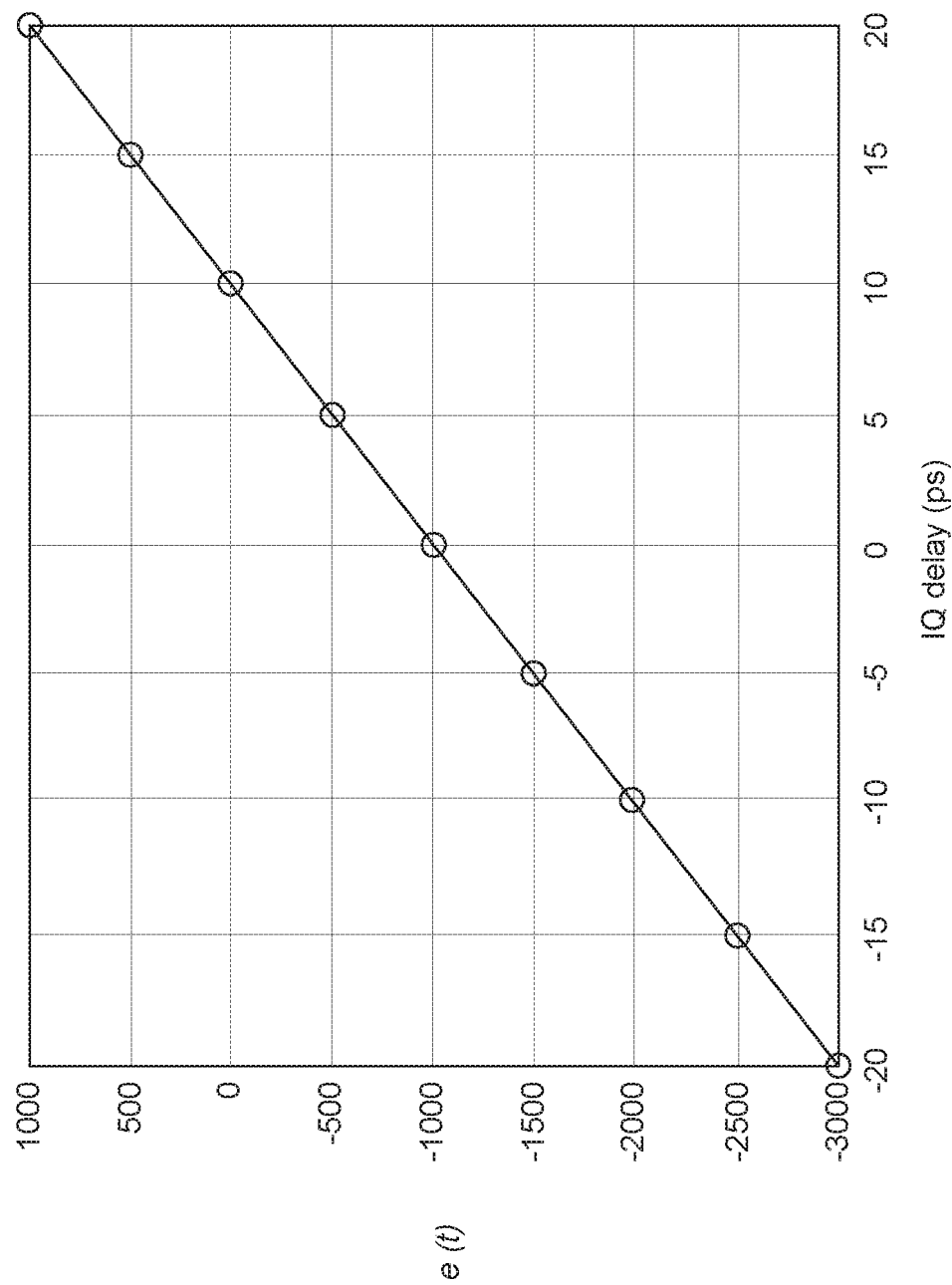
FIG. 5 shows example simulation results of the value of the resultant difference signal while sweeping the digital IQ delay.

FIG. 5 shows example simulation results of the value of the resultant difference signal e(t) while sweeping the digital IQ delay as defined by $$\frac{\varphi_I - \varphi_Q}{\omega_c}$$

(Equation (9)). As mentioned above, the digital IQ delay may be introduced by choosing the values of constants $\varphi_I$ and $\varphi_Q$ in Equations (1a) and (1b). The optical phase between the in-phase and quadrature paths may be detuned from 90 degrees. The example simulation results in FIG. 5 assume that the actual physical IQ skew is 10 ps. Then, the resultant difference signal e(t) goes to zero when the digital IQ delay is at 10 ps, which corresponds to the actual physical IQ skew, as expected from Equation (9).

The equations above for calculating the IQ skew apply to an implementation that uses two iterations of dither signal generation and measurement, where the resultant difference signal e(t) is formed by taking the difference between the two consecutive digital sample measurements.

In alternative implementation, the operations above may be performed in parallel by applying two different secondary frequencies of $\omega_I$ and $\omega_Q$ instead of a single frequency $\omega$, in Equations (1a) and (1b). In this case, the dither signals $s_I$ and $s_Q$ become more complex due to the simultaneous presence of frequencies $\omega_I$ and $\omega_Q$. The electrical field representation of the optical signal (e.g., signal 221 in FIG. 4) may be expressed in the following equation:

$$E(t)=\sin[\omega_c(t-\tau_I)+\varphi_I][1+\sin(\omega_I(t-\tau_I))]+e^{j\theta_S}\sin[\omega_c(t-\tau_Q)+\varphi_Q][1+\sin(\omega_Q(t-\tau_Q))] \quad \text{Equation (10)}$$

Then the optical power $P_{opt}(t)$ may be calculated using the following equation:

$$P_{opt}(t)=\sin^2[\omega_c(t-+\tau_I)+\varphi_I][1+\sin(\omega_I(t-\tau_I))]^2+\sin^2[\omega_c(t-\tau_Q)+\varphi_Q][1+\sin(\omega_Q(t-\tau Q))]^2+\cos(\phi_S)\sin(\omega_c(t-\tau_I)+\varphi_I)\sin(\omega_c(t-\tau_Q)+\varphi_Q)\times[1+\sin(\omega_I(t-\tau_I))][1+\sin(\omega_Q(t-\tau_Q))] \quad \text{Equation (11)}$$

If only the first-order, different and sum frequency terms with respect to frequencies $\omega_I$ and $\omega_Q$ are maintained, and it is assumed that $\omega_I\tau_I\cong 0$ and $\omega Q\tau_Q\cong 0$, then the simplified equation for calculating the optical power $P_{opt}(t)$ (i.e., tone amplitude) is as follows:

$$P_{opt}(t)=\sin(\omega_I(t-\tau_I)+\varphi_I)+\sin(\omega_Q(t-\tau_Q)+\varphi_Q)+\tfrac{1}{2}\cos(\phi_S)\cos(-\omega_c(\tau_I-\tau_Q)+(\varphi_I-\varphi_Q))\{\sin(\omega_I t)+\sin(\omega_Q t)+\tfrac{1}{2}\cos[(\omega_I-\omega_Q)t]-\tfrac{1}{2}\cos[(\omega_I+\omega_Q)t]\} \quad \text{Equation (12)}$$

The resultant difference signal e(t) (representing the value of the IQ skew in the transmitter 400) may be directly calculated from the difference or the sum frequency terms, which are represented as $(\omega_I-\omega_Q)$ and $(\omega_I+\omega Q)$, respectively.

Figure 6:
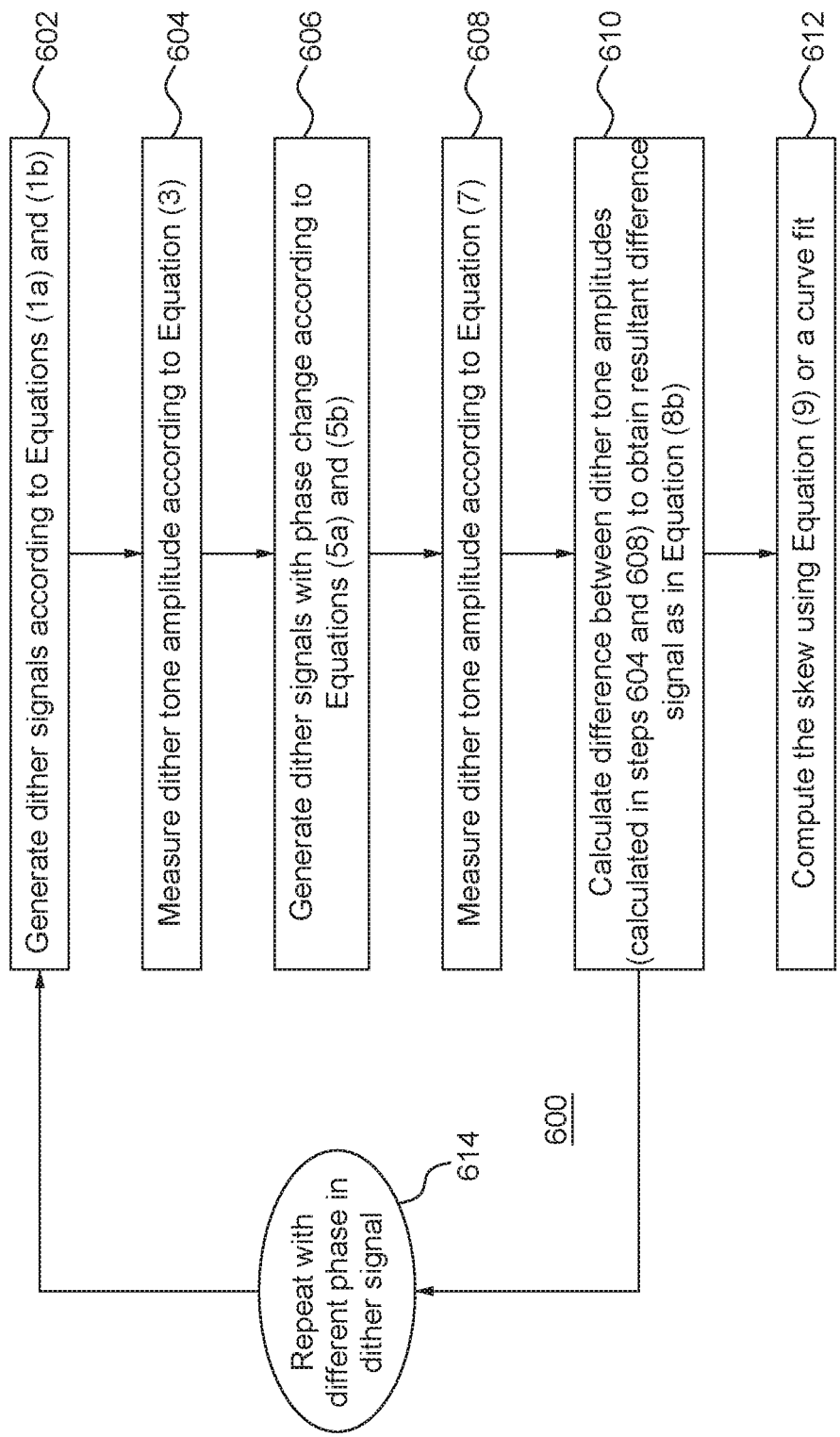
FIG. 6 is a flow chart of an example IQ skew detection method to detect the skew between the in-phase and quadrature paths in a transmitter using a serial implementation with two dither signal iterations, in accordance with the disclosures herein.

FIG. 6 is a flow chart of an example IQ skew detection procedure 600 to detect the skew between the in-phase and quadrature paths in a transmitter using a serial implementation with two dither signal iterations, in accordance with the disclosures herein.

At 602, dither signals may be generated according to Equations (1a) and (1b) (e.g., by the dither signal generators 204 and 206 in FIG. 2, or dither signal generators 304 and 306 in FIG. 3). At 604, dither tone amplitude may be measured using Equation (3) for calculating optical power (e.g., using the dither tone detection circuit 224 in FIG. 2, 3 or 4). At 606, a second set of dither signals with phase change may be generated according to Equation (5a) and (5b) (e.g., by the dither signal generators 204 and 206 in FIG. 2, or dither signal generators 304 and 306 in FIG. 3). At 608, the dither tone amplitude of the second set of dither tone signals with phase change may be measured using Equation (7) (e.g., using the dither tone detection circuit 224 in FIG. 2, 3 or 4). At 610, the difference between dither tone amplitudes (calculated at steps 604 and 608) may be calculated to obtain the resultant difference signal according to Equation (8b) (e.g., using dither tone processing circuit 226 in FIG. 2, 3, or 4). At 612, the IQ skew may be calculated as the difference in time delays in the in-phase and quadrature paths using Equation (9).

At 614, the measurement is repeated after changing the phases $\varphi_I$ and $\varphi_Q$ of the frequency $\omega_c$ according to Equation (1a) and (1b) at 602, and Equation (5a) and (5b) at 606, respectively. The example IQ skew detection procedure 600 may be repeated for a number of iterations to obtain a curve such as the curve shown in FIG. 5, where the number of points in FIG. 5 is determined by the number of iterations. A curve fitting technique (e.g., such as linear or polynomial regression or any other curve fitting technique) may be used to determine where the difference value e(t) becomes 0 and the corresponding skew value as shown in FIG. 5.

Figure 7:
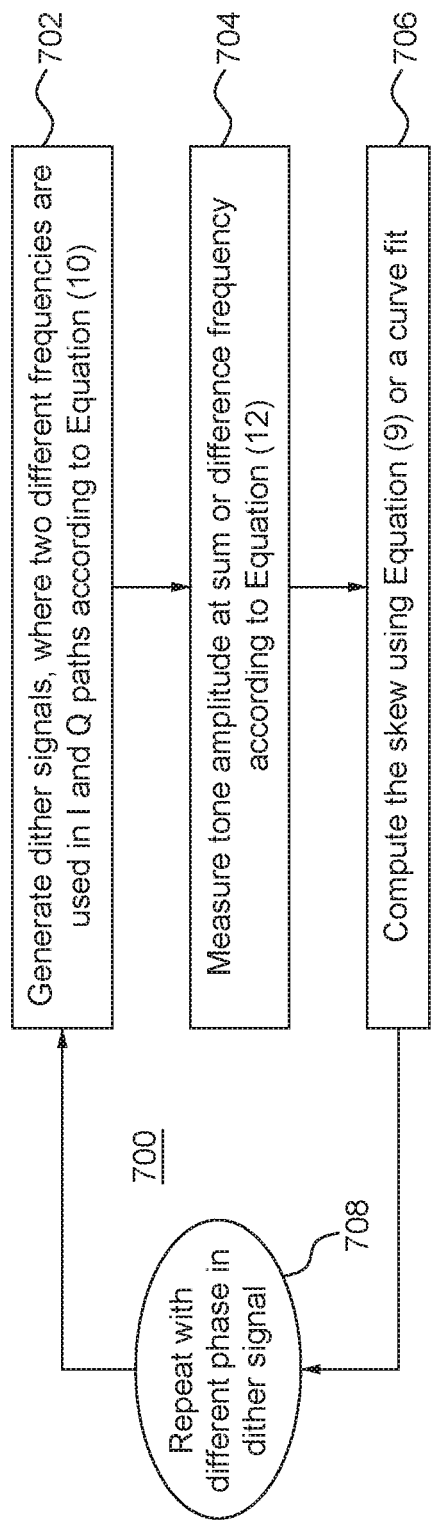
FIG. 7 is a flow chart of an example IQ skew detection method to detect the skew between the in-phase and quadrature paths in a transmitter using a parallel implementation with two different frequencies, in accordance with the disclosures herein.

FIG. 7 is a flow chart of an example IQ skew detection method 700 to detect the skew between the in-phase and quadrature paths in a transmitter using a parallel implementation with two different frequencies, in accordance with the disclosures herein. At 702, dither signals are generated, where two difference frequencies are used in the I and Q paths according to Equation (10). At 704, the tone amplitude may be measured at the sum or difference frequency according to Equation (12). At 706, the IQ skew may be calculated as the difference in time delays in the in-phase and quadrature paths using Equation (9) or by curve fitting. At 708, the measurement is repeated after changing the phases $\varphi_I$ and $\varphi_Q$ of the frequency $\omega_c$, and can be repeated for a number of iterations to obtain a curve as shown in FIG. 5 and explained above.

In another embodiment, algorithms may be used to calculate the insertion loss in a transmitter and enable characterization of transmitter impairment are described in the following. The principle of operation of insertion loss may involve applying a dither signal in one of the in-phase and quadrature paths at a time. In the following description and equations, it is assumed the in-phase path is being measured (although the quadrature path may be similarly measured using the same equations). The dither signals may contain frequency content as defined by the following equation as a function of time t ($s_Q$ (t) may be similarly defined):

$$s_I(t)=\sin[(w_c t+\varphi_I)(1+\sin(\omega t))] \quad \text{Equation(13)}$$

where $\omega_c$ and $\omega$ are $\omega$ are the primary and secondary frequencies for the sinusoid waveforms, and $\varphi_I$ is a constant that control the phase of the primary frequency $\omega_c$. With reference to FIG. 4, the optical power $P_{opt}(t)$ of the optical signal 221 entering the photodetector 432 may be defined by the following equation:

$$P_{opt}(t) = E(t)E^*(t) = [A_I s_I(t)]^2 = A_I^2 \sin^2[\omega_c t + \varphi_I][1+\sin(\omega t)]^2 \quad \text{Equation (14)}$$

where E(t) represents the electrical field of the optical signal, E*(t) represents the complex conjugate of the electrical field of the optical signal, and $A_I$ is represents the amplitude response the dither signal experiences at frequency $\omega_c$, and thus the insertion loss.

By only including the first-order term with respect to frequency $\omega$, the approximated optical power $P_{opt}(t)$ may be expressed by the following equation:

$$P_{opt}(t) \approx A_I^2 \sin(\omega t) \quad \text{Equation (15)}$$

With reference to FIG. 4, the photodetector 432 may detect the optical power $P_{opt}(t)$ of the optical signal 221 and convert it into electrical signal 435 after analog filtering. In this case, the digital samples d(t) (digital samples 437 after A/D conversion 434 in FIG. 4) present in the dither tone processor 230 may be expressed by the following equation:

$$d(t) \approx A_I^2 \sin(\omega t) \quad \text{Equation (16)}$$

The amplitude of frequency ω may then be determined as $A_I^2$, using for example spectrum analysis or lock-in detection. Then, the amplitude response $A_I$ in the optical field may be determined by taking a square root on the measured amplitude of frequency ω.

The dither tone process described above may be repeated by sweeping (scanning or varying) the dither frequency $ω_c$ to obtain an insertion loss characterization over difference frequency values. The process may also be repeated for each of the in-phase and quadrature paths and within different polarizations and/or wavelength channels. With reference to FIG. 4, the insertion loss $A_I$ determined in dither tone processing circuit 226 may be provided to the TX DSP 110 for insertion loss variation compensation to improve transmitter signal integrity.

The method described above for determining insertion loss $A_I$ may be used during normal operation (e.g., while the optical transmitter is being used for regular user data communications), but dither signals may need to be sufficient small relative to the data signals so as not to disturb the data signals. The method described above for determining insertion loss $A_I$ may be used during factory calibration, transmitter start up, transmitter turn down and/or during wavelength tuning in the field.

Figure 8:
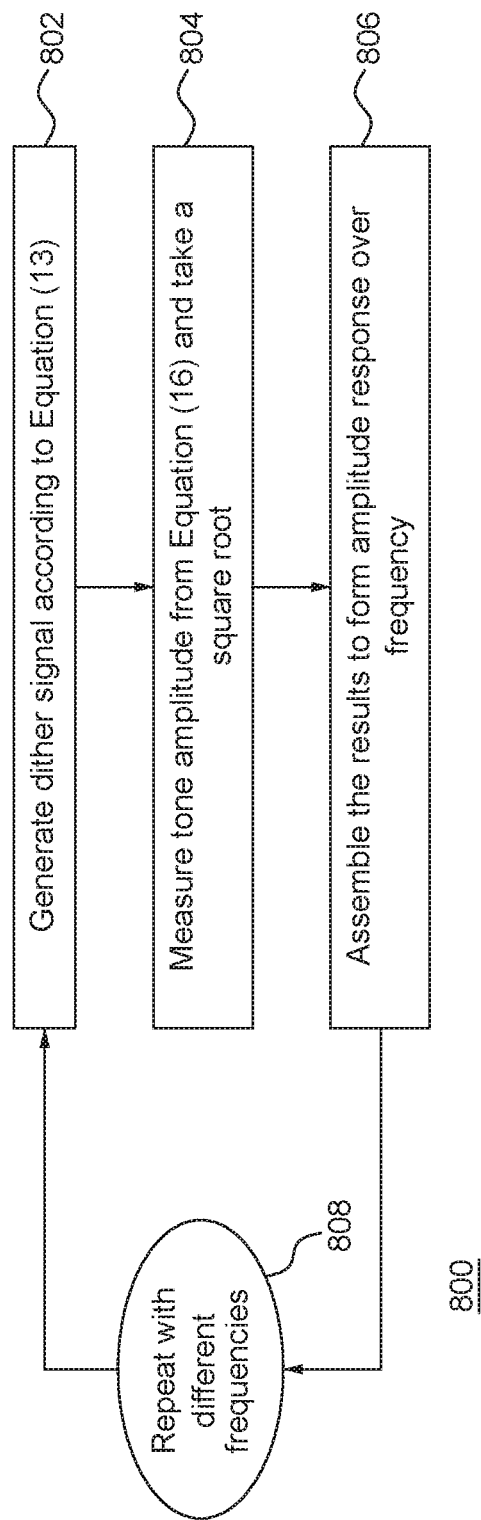
FIG. 8 is a flow chart of an example insertion loss characterization method to calculate the insertion loss in a transmitter over frequency.

FIG. 8 is a flow chart of an example insertion loss characterization method 800 to calculate the insertion loss in a transmitter over frequency. At 802, a dither signal may be generated according to Equation (13). At 804, the tone amplitude of the optical signal may be measured according to Equation (16) and the amplitude response in the optical field may be determined by taking a square root on the measured amplitude of frequency. At 808, the measurement with a different frequency $ω_c$ may be repeated for a number of iterations until all the frequencies of interest are measured. At 806, the measurement results are collected from all the frequencies of interest to generate a characterization of insertion loss as a function of frequency.

It should be understood that many variations are possible based on the disclosure herein. Although features and elements are described above in particular combinations, each feature or element may be used alone without the other features and elements or in various combinations with or without other features and elements.

The methods and elements disclosed herein may be implemented in/as a general purpose computer, a processor, a processing device, or a processor core. Suitable processing devices include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods, flow charts and elements disclosed herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A coherent optical transmitter comprising:
   a processor configured to receive a digital data signal carrying digitized user data, the digital data signal including an in-phase (I) component and a quadrature (Q) component;
   the processor comprising:
      a first dither signal generator configured to generate a first dither signal,
      a second dither signal generator configured to generate a second dither signal,
      a first combiner configured to combine the first dither signal with the I component of the digital data signal to generate an I combined signal,
      a second combiner configured to combine the second dither signal with the Q component of the digital data signal to generate a Q combined signal,
      a first digital-to-analog converter configured to convert the I combined signal into an I analog waveform, and
      a second digital-to-analog converter configured to convert the Q combined signal into a Q analog waveform;
   an optical transmitter frontend configure to generate an optical signal corresponding to the I and Q analog waveforms for transmission over an optical fiber; and
   a dither tone processor configured to calculate, based on the optical signal, at least one of an IQ skew and an insertion loss associated with the coherent optical transmitter and provide the at least one of the IQ skew and the insertion loss to the processor to correct for an impairment associated with the at least one of IQ skew and the insertion loss,
   wherein the dither tone processor is further configured to:
   measure a first optical power of the optical signal as a function of frequency, phase and difference in time delay between an I path and a Q path in the coherent optical transmitter, wherein the optical signal is generated based on the first and second dither signals;
   measure a second optical power of a second optical signal as a function of frequency, phase and difference in time delay between the I path and the Q path in the coherent optical transmitter, wherein the second optical signal is generated based on third and fourth dither signals;
   calculate an amplitude difference between the first optical power and the second optical power; and
   calculate the IQ skew based on a primary frequency and phases of the primary frequency in the I and Q paths that result in the amplitude difference between the first and second optical powers being zero.

2. The coherent optical transmitter of claim 1, wherein the optical transmitter frontend comprises:
   a laser source configured to produce a laser signal; and
   an optical modulator configured to optically modulate the laser signal using the I and Q analog waveforms to generate the optical signal.

3. The coherent optical transmitter of claim 1, wherein the optical transmitter frontend further comprises:
   an optical combining device configured to combine the optical signal, which is associated with a first polarization, with at least one other optical signal associated with a second polarization.

4. The coherent optical transmitter of claim 1 further comprising:
an optical coupler configured to provide at least a portion of the optical signal to the dither tone processor.

5. The coherent optical transmitter of claim 1, wherein the dither tone processor further comprises:
a photodetector configured to convert the optical signal into an electrical signal;
an analog-to-digital converter configured to convert the electrical signal into a plurality of digital samples; and
a dither tone processing circuit configured to calculate the at least one of the IQ skew and the insertion loss associated with the coherent optical transmitter.

6. The coherent optical transmitter of claim 5, wherein the dither tone processor further comprises:
a transimpedance amplifier (TIA) configured to convert the electrical signal into an electrical voltage with an associated amplification or gain.

7. The coherent optical transmitter of claim 1, wherein the amplitude difference between the first and second optical powers is calculated on a secondary frequency that is different than the primary frequency.

8. A coherent optical transmitter comprising:
a processor configured to receive a digital data signal carrying digitized user data, the digital data signal including an in-phase (I) component and a quadrature (Q) component, and convert the digital data signal into an analog I signal and an analog Q signal;
an optical transmitter frontend comprising:
a first dither signal generator configured to generate a first dither signal,
a second dither signal generator configured to generate a second dither signal,
a first combiner configured to combine the first dither signal with the analog I signal to generate an I combined signal,
a second combiner configured to combine the second dither signal with the analog Q signal to generate a Q combined signal, and
an optical modulator configured to generate an optical signal corresponding to the I and Q combined signals for transmission over an optical fiber; and
a dither tone processor configured to calculate, based on the optical signal, at least one of an IQ skew and an insertion loss associated with the coherent optical transmitter and provide the at least one of the IQ skew and the insertion loss to the processor to correct for an impairment associated with the at least one of IQ skew and the insertion loss,
wherein the dither tone processor is further configured to:
measure a first optical power of the optical signal as a function of frequency, phase and difference in time delay between an I path and a Q path in the coherent optical transmitter, wherein the optical signal is generated based on the first and second dither signals;
measure a second optical power of a second optical signal as a function of frequency, phase and difference in time delay between the I path and the Q path in the coherent optical transmitter, wherein the second optical signal is generated based on third and fourth dither signals;
calculate an amplitude difference between the first optical power and the second optical power; and
calculate the IQ skew based on a primary frequency and phases of the primary frequency in the I and Q paths that result in the amplitude difference between the first and second optical powers being zero.

9. The coherent optical transmitter of claim 8, wherein the processor comprises:
a digital signal processor configured to produce the I and Q components of the digital data signal;
a first digital-to-analog converter configured to convert the I component of the digital data signal into the analog I signal; and
a second digital-to-analog converter configured to convert the Q component of the digital data signal into the analog Q signal.

10. The coherent optical transmitter of claim 8, wherein the dither tone processor further comprises:
a photodetector configured to convert the optical signal into an electrical signal;
an analog-to-digital converter configured to convert the electrical signal into a plurality of digital samples; and
a dither tone processing circuit configured to calculate the at least one of the IQ skew and the insertion loss associated with the coherent optical transmitter.

11. The coherent optical transmitter of claim 10, wherein the dither tone processor further comprises:
a transimpedance amplifier (TIA) configured to convert the electrical signal into an electrical voltage with an associated amplification or gain.

12. A method performed by a coherent optical transmitter, the method comprising:
receiving a digital data signal carrying digitized user data, the digital data signal including an in-phase (I) component and a quadrature (Q) component;
generating a first dither signal;
generating a second dither signal;
combining the first dither signal with the I component of the digital data signal to generate an I combined signal;
combining the second dither signal with the Q component of the digital data signal to generate a Q combined signal;
converting the I combined signal into an I analog waveform;
converting the Q combined signal into a Q analog waveform;
generating an optical signal corresponding to the I and Q analog waveforms for transmission over an optical fiber; and
calculating, based on the optical signal, at least one of an IQ skew and an insertion loss associated with the coherent optical transmitter to correct for an impairment associated with the at least one of IQ skew and the insertion loss,
measuring a first optical power of the optical signal as a function of frequency, phase and difference in time delay between an I path and a Q path in the coherent optical transmitter, wherein the optical signal is generated based on the first and second dither signals;
measuring a second optical power of a second optical signal as a function of frequency, phase and difference in time delay between the I path and the Q path in the coherent optical transmitter, wherein the second optical signal is generated based on third and fourth dither signals;
calculating an amplitude difference between the first optical power and the second optical power; and
calculating the IQ skew based on a primary frequency and phases of the primary frequency in the I and Q paths that result in the amplitude difference between the first and second optical powers being zero.

13. The method of claim 12, further comprising:
producing a laser signal; and optically modulating the laser signal using the I and Q analog waveforms to generate the optical signal.

14. The method of claim 12, further comprising:
combining the optical signal, which is associated with a first polarization, with at least one other optical signal associated with a second polarization.

15. The method of claim 12, wherein the calculating at least one of the IQ skew and the insertion loss associated with the coherent optical transmitter is based on at least a portion of the optical signal.

16. The method of claim 12, further comprising:
converting the optical signal into an electrical signal;
converting the electrical signal into a plurality of digital samples; and
calculating the at least one of the IQ skew and the insertion loss associated with the coherent optical transmitter.

17. The method of claim 16, further comprising:
converting the electrical signal into an electrical voltage with an associated amplification or gain.

18. The method of claim 8, wherein the amplitude difference between the first and second optical powers is calculated on a secondary frequency that is different than the primary frequency.

* * * * *